(12) United States Patent
Yen (10) Patent No.: US 9,719,808 B2
(45) Date of Patent: Aug. 1, 2017

(54) SIGNAL PROCESSING APPARATUS FOR PROCESSING TIME VARIANT SIGNAL WITH FIRST AND SECOND INPUT SIGNALS COMPRISING A WEIGHTING CORRELATOR AND A FIRST GAIN-ADJUSTABLE AMPLIFIER

(71) Applicant: RDC Semiconductor Co., Ltd., Hsinchu (TW)

(72) Inventor: Ming-Chou Yen, Hsinchu (TW)

(73) Assignee: RDC SEMICONDUCTOR CO., LTD., Hsinchu (TW)

( * ) Notice: Subject to any disclaimer, the term of this patent is extended or adjusted under 35 U.S.C. 154(b) by 0 days.

(21) Appl. No.: 15/440,639

(22) Filed: Feb. 23, 2017

(65) Prior Publication Data

US 2017/0160107 A1 Jun. 8, 2017

Related U.S. Application Data

(62) Division of application No. 14/530,030, filed on Oct. 31, 2014, now Pat. No. 9,625,282.

(30) Foreign Application Priority Data

Dec. 5, 2013 (TW) .............................. 102144595 A (51) Int. Cl.
*G01D 5/244* (2006.01)
*G01D 5/347* (2006.01)
(52) U.S. Cl.
CPC ....... *G01D 5/2448* (2013.01); *G01D 5/24419* (2013.01); *G01D 5/24476* (2013.01); *G01D 5/3473* (2013.01)

(58) Field of Classification Search
CPC ............ G01D 5/2448; G01D 5/24419; G01D 5/24476; G01D 5/24495; G01D 5/3473; H03M 1/26; H03M 1/22; H03M 1/30; H03M 1/306; H03M 1/303
See application file for complete search history.

(56) References Cited

U.S. PATENT DOCUMENTS

| 4,355,326 | A | * | 10/1982 | Lee .......................... H04N 9/64 348/628 |
| 4,454,511 | A | | 6/1984 | Peters |
| 5,697,083 | A | * | 12/1997 | Sano .................... H04B 7/0857 455/276.1 |
| 7,411,530 | B2 | | 8/2008 | Kopken |
| 9,140,581 | B2 | | 9/2015 | Shimada et al. |
| 2013/0077669 | A1 | * | 3/2013 | Malipatil .......... H04L 25/03019 375/233 |

* cited by examiner

*Primary Examiner* — Que T Le
*Assistant Examiner* — Jennifer Bennett
(74) *Attorney, Agent, or Firm* — WPAT, PC (57) ABSTRACT

A signal processing apparatus receiving a first input signal and the first input signal being directly used as a first output signal. The signal processing apparatus comprising: a first gain-adjustable amplifier receiving the first input signal and generating a gain-adjusted first input signal according to a gain; a first adder for subtracting the gain-adjusted first input signal from the second input signal, thereby generating a second output signal; and a weighting correlator receiving the first output signal and the second output signal, and generating the first integrated signal to control the gain.

8 Claims, 7 Drawing Sheets

SIGNAL PROCESSING APPARATUS FOR PROCESSING TIME VARIANT SIGNAL WITH FIRST AND SECOND INPUT SIGNALS COMPRISING A WEIGHTING CORRELATOR AND A FIRST GAIN-ADJUSTABLE AMPLIFIER

This is a divisional application of co-pending U.S. application Ser. No. 14/530,030, filed Oct. 31, 2014, which claims the benefit of Taiwan Patent Application No. 102144595, filed Dec. 5, 2013, the subject matter of which is incorporated herein by reference.

FIELD OF THE INVENTION

The present invention relates to a signal processing apparatus, and more particularly to a signal processing apparatus of a servo motor system for processing a time variant signal.

BACKGROUND OF THE INVENTION

As is well known, a servo motor system is able to precisely control the rotation speed of a servo motor, and has the fast response to acceleration, deceleration and reversion. Due to the precise position control capability and the speed control capability, the servo motor system has been widely used in various industrial automation industries and precision machining fields such as mechanical arms or mechanical work platforms.

Figure 1A:
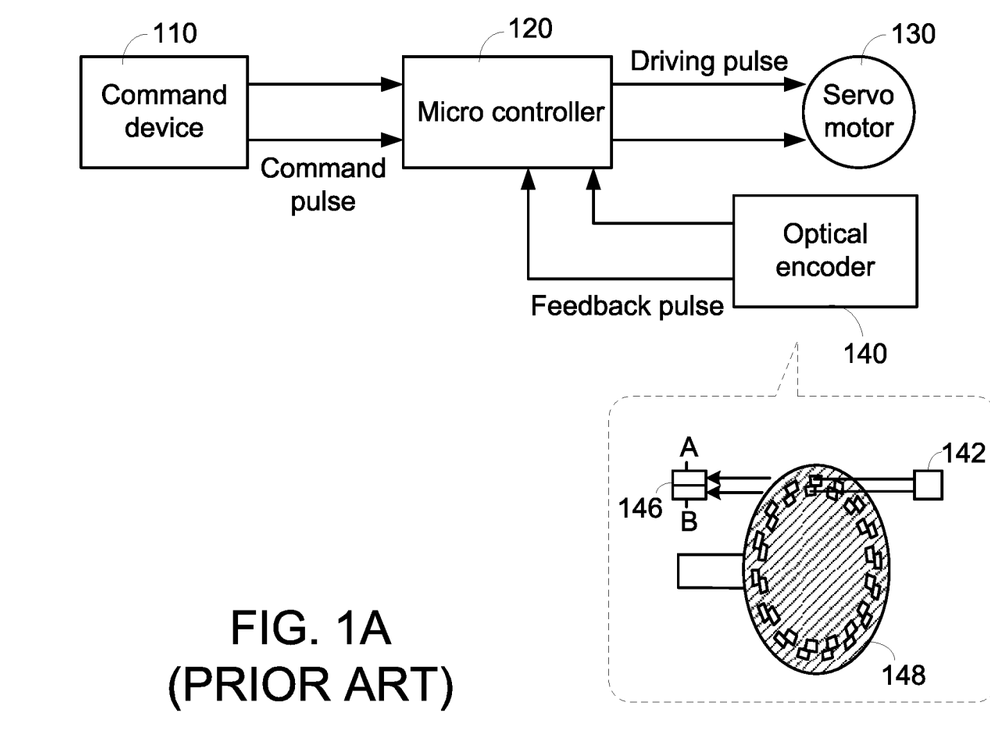
FIG. 1A (prior art) is a schematic functional block diagram illustrating the architecture of a conventional servo motor system.

FIG. 1A is a schematic functional block diagram illustrating the architecture of a conventional servo motor system. As shown in FIG. 1A, the servo motor system comprises a command device 110, a micro controller 120, a servo motor 130, and an optical encoder 140. Furthermore, the optical encoder is also called a photo sensor.

In response to the user's operation, the command device 110 generates a command pulse for controlling a rotation speed and a rotation direction of the servo motor 130. Moreover, according to the rotation speed and the rotation direction of the servo motor 130, the optical encoder 140 generates a feedback pulse to the micro controller 120. Moreover, according to the command pulse and the feedback pulse, the micro controller 120 generates a driving pulse to the servo motor 130.

By the optical encoder 140, a displacement amount of a rotating shaft of the servo motor 130 is transformed into the feedback pulse. According to the feedback pulse from the optical encoder 140, the micro controller 120 may realize the rotation speed, the rotation direction and the position of the servo motor 130.

For example, the optical encoder 140 is a rotary optical encoder. The optical encoder 140 comprises a light source 142, a photo detector 146, and a disk 148. The disk 148 is coupled to the rotating shaft of the servo motor 130. In addition, the disk 148 is rotated with the servo motor 130. Moreover, after a light beam emitted by the light source 142 passes through gratings of the disk 148, the light beam is received by the photo detector 146. According to the shapes of the gratings of the disk 148, the photo detector 146 generates two photoelectronic signals A and B. According to the two photoelectronic signals A and B, the optical encoder 140 generates the feedback pulse to the micro controller 120.

Figure 1B:
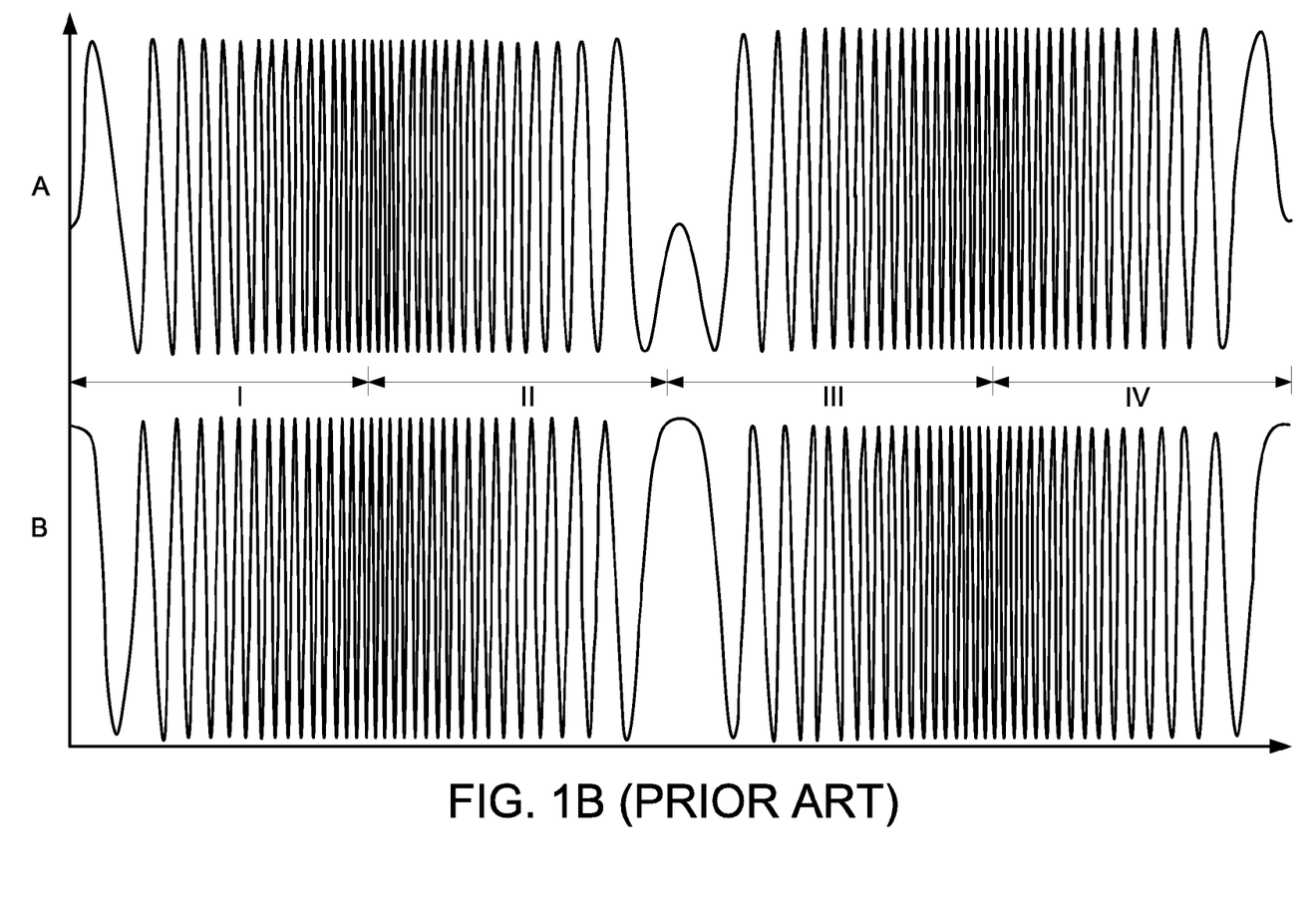
FIG. 1B (prior art) is a schematic timing waveform diagram illustrating the two photoelectronic signals A and B generated by the photo detector of the servo motor system of FIG. 1A.

FIG. 1B is a schematic timing waveform diagram illustrating the two photoelectronic signals A and B generated by the photo detector of the servo motor system of FIG. 1A. Generally, as the frequencies of the two photoelectronic signals A and B are increased, the rotation speed of the servo motor 130 is increased. In addition, there is a phase difference between the two photoelectronic signals A and B. For example, if the phase of the photoelectronic signal B leads the phase of the photoelectronic signal A by 90 degrees, the servo motor 130 is rotated in a first direction (e.g. a clockwise direction). Whereas, if the phase of the photoelectronic signal A leads the phase of the photoelectronic signal B by 90 degrees, the servo motor 130 is rotated in a second direction (e.g. a counterclockwise direction).

Please refer to FIG. 1B again. In the time interval I, the frequencies of the two photoelectronic signals A and B are gradually increased, and the phase of the photoelectronic signal B leads the phase of the photoelectronic signal A by 90 degrees. In other words, the servo motor 130 is rotated in the first direction, and the rotation speed of the servo motor 130 is gradually increased. In the time interval II, the frequencies of the two photoelectronic signals A and B are gradually decreased, and the phase of the photoelectronic signal B leads the phase of the photoelectronic signal A by 90 degrees. In other words, the servo motor 130 is rotated in the first direction, and the rotation speed of the servo motor 130 is gradually decreased until the rotation of the servo motor 130 is stopped.

In the time interval III, the frequencies of the two photoelectronic signals A and B are gradually increased, and the phase of the photoelectronic signal A leads the phase of the photoelectronic signal B by 90 degrees. In other words, the servo motor 130 is rotated in the second direction, and the rotation speed of the servo motor 130 is gradually increased. In the time interval IV, the frequencies of the two photoelectronic signals A and B are gradually decreased, and the phase of the photoelectronic signal A leads the phase of the photoelectronic signal B by 90 degrees. In other words, the servo motor 130 is rotated in the second direction, and the rotation speed of the servo motor 130 is gradually decreased until the rotation of the servo motor 130 is stopped.

From the above discussions, during acceleration or deceleration of the servo motor 130, the frequencies and phases of the two photoelectronic signals A and B are subjected to changes. In other words, the two photoelectronic signals A and B are time variant signals. However, during photoelectric conversion, the two photoelectronic signals A and B may be adversely affected by temperature or environmental factors. For example, the two photoelectronic signals A and B may be suffered from DC offsets or amplitude attenuation, or the phase difference between the two photoelectronic signals A and B fails to be maintained at 90 degrees. Under this circumstance, the position and the rotation speed of the servo motor 130 fail to be accurately acquired according to the feedback pulse.

SUMMARY OF THE INVENTION

An embodiment of the present invention provides a signal processing apparatus for processing a time variant signal. The signal processing apparatus includes a first adder and a first weighting integrator. The first adder receives a first input signal and a first integrated signal, and generates a first output signal. The first output signal is obtained by subtracting the first integrated signal from the first input signal. The first weighting integrator receives a first specified signal, and generates the first integrated signal. The first weighting integrator includes a first weighting function generator, a first multiplier, and a first accumulator. The first weighting function generator receives the first specified signal. When the first specified signal crosses a zero crossing point, the first weighting function generator generates a first weighting function. The first multiplier performs a multiplication on the first weighting function and the first output signal, thereby obtaining a product of the first weighting function and the first output signal. The first accumulator is connected to the first multiplier for accumulating the product of the first weighting function and the first output signal, thereby generating the first integrated signal.

Another embodiment of the present invention provides a signal processing apparatus for processing a time variant signal. The signal processing apparatus receives a first input signal and a second input signal. The signal processing apparatus comprises: a first gain-adjustable amplifier, wherein a gain of the first gain-adjustable amplifier is adjusted according to a first integrated signal, wherein after the first input signal is received by the first gain-adjustable amplifier, a gain-adjusted first input signal is generated by the first gain-adjustable amplifier; a first adder for subtracting the gain-adjusted first input signal from the second input signal, thereby generating a second output signal; a second gain-adjustable amplifier, wherein a gain of the second gain-adjustable amplifier is adjusted according to the first integrated signal, wherein after the second input signal is received by the second gain-adjustable amplifier, a gain-adjusted second input signal is generated by the second gain-adjustable amplifier; a second adder for subtracting the gain-adjusted second input signal from the first input signal, thereby generating a first output signal; and a weighting correlator receiving the first output signal and the second output signal, and generating the first integrated signal, wherein the weighting correlator comprises: a weighting function generator receiving the first output signal and the second output signal, wherein when the first output signal and the second output signal cross a zero crossing point, the weighting function generator generates a weighting function; a first multiplier for performing a multiplication on the first output signal and the second output signal, thereby obtaining a first result; a second multiplier for performing a multiplication on the weighting function and the first result, thereby obtaining a second result; and an accumulator connected to the second multiplier for accumulating the second result, thereby generating the first integrated signal.

A further embodiment of the present invention provides a signal processing apparatus for processing a time variant signal. The signal processing apparatus receives a first input signal and a second input signal. The first input signal is directly used as a first output signal. The signal processing apparatus includes a first gain-adjustable amplifier, a first adder, and a weighting correlator. A gain of the first gain-adjustable amplifier is adjusted according to a first integrated signal. After the first input signal is received by the first gain-adjustable amplifier, a gain-adjusted first input signal is generated by the first gain-adjustable amplifier. The first adder subtracts the gain-adjusted first input signal from the second input signal, thereby generating a second output signal. The weighting correlator receives the first output signal and the second output signal, and generates the first integrated signal. The weighting correlator includes a weighting function generator, a first multiplier, a second multiplier and an accumulator. The weighting function generator receives the first output signal and the second output signal. When the first output signal and the second output signal cross a zero crossing point, the weighting function generator generates a weighting function. The first multiplier performs a multiplication on the first output signal and the second output signal, thereby obtaining a first result. The second multiplier performs a multiplication on the weighting function and the first result, thereby obtaining a second result. The accumulator is connected to the second multiplier for accumulating the second result, thereby generating the first integrated signal.

A further embodiment of the present invention provides a signal processing apparatus for processing a time variant signal. The signal processing apparatus receives a first input signal and a second input signal. The signal processing apparatus includes a first gain-adjustable amplifier, a first magnitude detector, a first adder, and a first weighting integrator. A gain of the first gain-adjustable amplifier is adjusted according to a first integrated signal. The first gain-adjustable amplifier receives the first input signal and generates a first output signal. The first magnitude detector receives the first output signal, and generates a first magnitude signal. The first adder subtracts the first magnitude signal from a reference value, thereby generating a first sampling signal. The first weighting integrator receives the first input signal, the second input signal and the first sampling signal, and generates the first integrated signal. The first weighting integrator includes a first weighting function generator, a first multiplier, and a first accumulator. The first weighting function generator receives the first input signal and the second input signal. When the first input signal and the second input signal cross a zero crossing point, the first weighting function generator generates a first weighting function. The first multiplier performs a multiplication on the first sampling signal and the first weighting function, thereby obtaining a product of the first sampling signal and the first weighting function. The first accumulator is connected to the first multiplier for accumulating the product of the first sampling signal and the first weighting function, thereby generating the first integrated signal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 2:
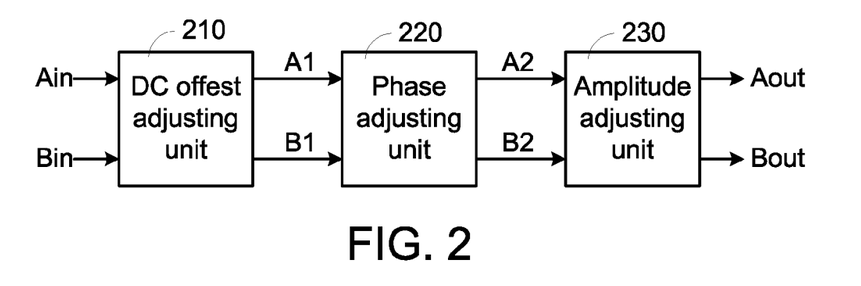
FIG. 2 schematically illustrates the architecture of a signal processing apparatus for processing a time variant signal according to an embodiment of the present invention.

FIG. 2 schematically illustrates the architecture of a signal processing apparatus for processing a time variant signal according to an embodiment of the present invention. The signal processing apparatus may be applied to an optical encoder in order for receiving photoelectronic signals Ain and Bin from a photo detector of the optical encoder. As shown in FIG. 2, the signal processing apparatus comprises a DC offset adjusting unit 210, a phase adjusting unit 220, and an amplitude adjusting unit 230. After the first photoelectronic signal Ain and the second photoelectronic signal Bin are received by the DC offset adjusting unit 210, the DC offsets of the first photoelectronic signal Ain and the second photoelectronic signal Bin are eliminated. Consequently, a first adjusted signal A1 and a second adjusted signal B1 are outputted from the DC offset adjusting unit 210. Moreover, after the first adjusted signal A1 and the second adjusted signal B1 are received by the phase adjusting unit 220, a phase difference between the first adjusted signal A1 and the second adjusted signal B1 is controlled by the phase adjusting unit 220 so as to be maintained at 90 degrees. Consequently, a third adjusted signal A2 and a fourth adjusted signal B2 are outputted from the phase adjusting unit 220. Moreover, after the third adjusted signal A2 and the fourth adjusted signal B2 are received by the amplitude adjusting unit 230, the amplitudes of the third adjusted signal A2 and the fourth adjusted signal B2 are controlled by the amplitude adjusting unit 230 so as to be maintained at fixed values. Consequently, a first output signal Aout and a second output signal Bout are generated by the amplitude adjusting unit 230. The operations of the DC offset adjusting unit 210, the phase adjusting unit 220 and the amplitude adjusting unit 230 of the signal processing apparatus will be illustrated in more details as follows.

Figure 3A:
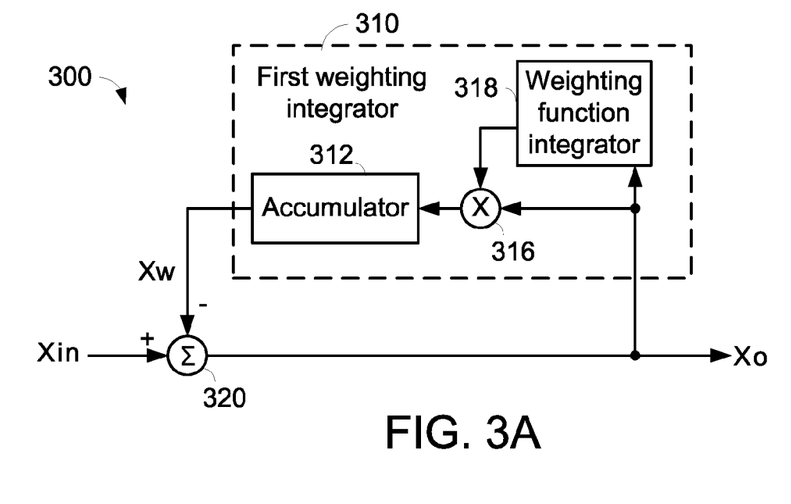
FIG. 3A is a schematic functional block diagram illustrating the DC offset adjusting unit of the signal processing apparatus according to an embodiment of the present invention.
Figure 3B:
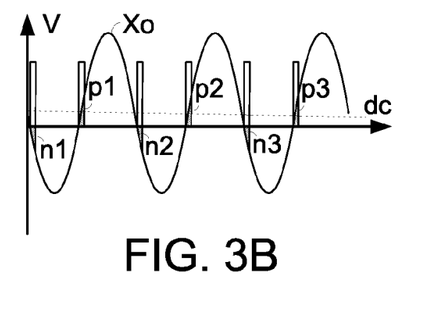
FIGS. 3B-3C are schematic timing waveform diagrams illustrating associated signal processed by the DC offset adjusting unit.
Figure 3C:
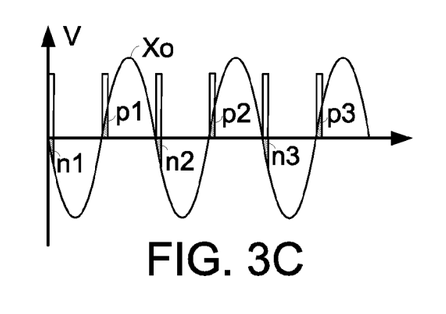

FIG. 3A is a schematic functional block diagram illustrating the DC offset adjusting unit of the signal processing apparatus according to an embodiment of the present invention. FIGS. 3B-3C are schematic timing waveform diagrams illustrating associated signal processed by the DC offset adjusting unit. The DC offset adjusting unit 210 comprises two DC offset adjusting circuits 300. For clarification and brevity, only one DC offset adjusting circuit 300 is shown in the drawing. The first photoelectronic signal Ain and the second photoelectronic signal Bin are the input signals Xin of the two DC offset adjusting circuits 300, respectively.

As shown in FIG. 3A, the DC offset adjusting circuit 300 comprises a first adder 320 and a first weighting integrator 310. The first adder 320 is used for subtracting an integrated signal Xw from the input signal Xin, thereby generating an output signal Xo. Moreover, after the output signal Xo is processed by the first weighting integrator 310, the integrated signal Xw is generated.

The first weighting integrator 310 comprises a multiplier 316, a weighting function generator 318, and an accumulator 312. In this embodiment, when the output signal Xo crosses a zero crossing point, the weighting function generator 318 generates a weighting function. Moreover, the product of the output signal Xo and the weighting function is obtained by the multiplier 316 and transmitted to the accumulator 312. After the product of the output signal Xo and the weighting function is accumulated by the accumulator 312, an integrated signal Xw is generated.

As mentioned above, the DC offset adjusting unit 210 is composed of two DC offset adjusting circuits 300. In some embodiments, the output signal of the other DC offset adjusting circuit (not shown) may be used as the input of the weighting function generator 318 of the DC offset adjusting circuit 300 as shown in FIG. 3A.

Alternatively, in some other embodiments, the output signals of the two DC offset adjusting circuits 300 may be simultaneously used as the inputs of the weighting function generator 318.

In this embodiment, the weighting function is a pulse train function. In FIGS. 3B and 3C, the operations of the DC offset adjusting unit 210 are illustrated by using the pulse train function as the weighting function.

Please refer to FIG. 3B. Whenever the output signal Xo crosses the zero crossing point, the weighting function generator 318 generates a pulse train function. Moreover, the product of the output signal Xo and the pulse train function (i.e. the area as shown in FIG. 3B) is obtained by the multiplier 316. That is, the products of the negative parts of the output signal Xo and the pulse train function are negative values n1, n2, n3, . . . ; and the products of the positive parts of the output signal Xo and the pulse train function are positive values p1, p2, p3, . . . , and so on.

In practical applications, the multiplier 316 may be implemented by a programmable counter. That is, when the number of times the output signal Xo crosses the zero crossing point reaches a predetermined number, the accumulation operation of the accumulator 312 is stopped.

In case that the input signal Xin has a positive DC offset, the output signal Xo also has the positive DC offset dc. Since the output signal Xo has the positive DC offset dc, the areas p1, p2 and p3 are larger than the areas n1, n2 and n3, respectively. After the output result of the multiplier 316 is accumulated by the accumulator 312, a positive value of the integrated signal Xw is obtained. As shown in FIG. 3B, the positive DC offset dc of the output signal Xo is gradually decreased.

Please refer to FIG. 3C. After the positive DC offset dc of the output signal Xo is eliminated (i.e. the positive DC offset dc is decreased to zero), the areas p1, p2 and p3 are equal to the areas n1, n2 and n3. Meanwhile, by subtracting the integrated signal Xw from the input signal Xin, the output signal Xo with eliminated DC offset dc is obtained.

Similarly, in case that the input signal Xin has a negative DC offset, the output signal Xo has the negative DC offset. After the output result of the multiplier 316 is accumulated by the accumulator 312, a negative value of the integrated signal Xw is obtained. The negative DC offset of the output signal Xo is gradually increased from the negative value to zero.

In other words, after the first photoelectronic signal Ain is inputted into the DC offset adjusting circuit 300, the output signal Xo with eliminated DC offset is served as the first adjusted signal A1. Similarly, after the second photoelectronic signal Bin is inputted into the DC offset adjusting circuit 300, the output signal Xo with eliminated DC offset is served as the second adjusted signal B1.

In the above embodiment, the weighting function is a pulse train function. It is noted that numerous modifications and alterations may be made while retaining the teachings of the invention. For example, in another embodiment, the weighting function is an exponential decay function. Moreover, those skilled in the art will readily observe that the subtraction operation may be considered as an addition operation. That is, the adder may perform the subtraction operation.

Figure 4A:
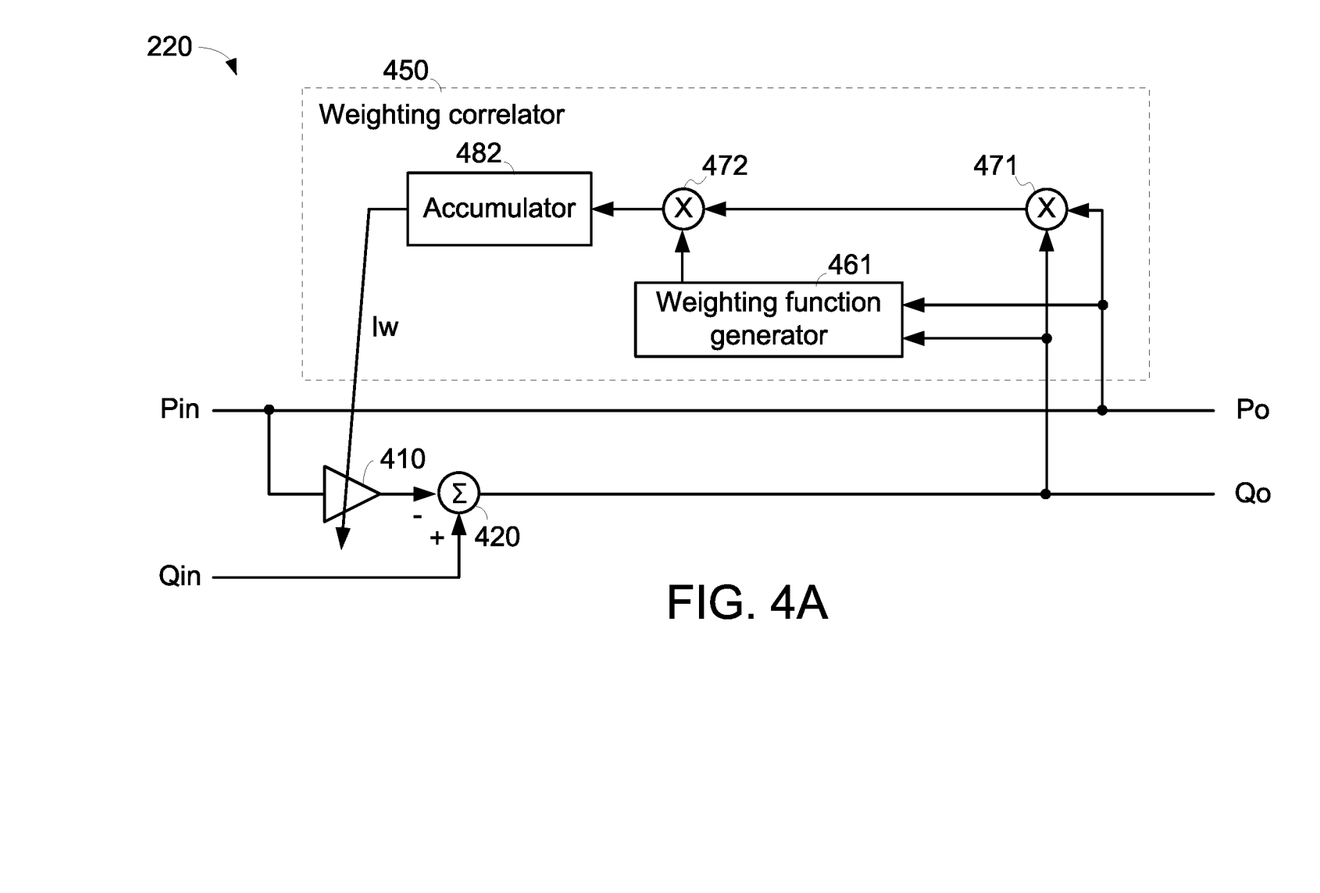
FIG. 4A is a schematic functional block diagram illustrating the phase adjusting unit of the signal processing apparatus according to an embodiment of the present invention.

FIG. 4A is a schematic functional block diagram illustrating the phase adjusting unit of the signal processing apparatus according to an embodiment of the present invention. As shown in FIG. 4A, the phase adjusting unit 220 comprises a gain-adjustable amplifier 410, an adder 420, and a weighting correlator 450. The phase difference between a first input signal Pin and a second input signal Qin is about 90 degrees. In addition, the first input signal Pin is identical to a first output signal Po. The phase difference between the first output signal Po and a second output signal Qo is 90 degrees. The first adjusted signal A1 and the second adjusted signal B1 from the DC offset adjusting unit 210 may be respectively used as the first input signal Pin and the second input signal Qin of the phase adjusting unit 220. Alternatively, the second adjusted signal B1 and the first adjusted signal A1 may be respectively used as the first input signal Pin and the second input signal Qin of the phase adjusting unit 220. The first output signal Po and the second output signal Qo from the phase adjusting unit 220 may be considered as the third adjusted signal A2 and the fourth adjusted signal B2, respectively.

Moreover, according to an integrated signal Iw outputted from the weighting correlator 450, a gain of the gain-adjustable amplifier 410 is correspondingly adjusted. After the first input signal Pin is received by the gain-adjustable amplifier 410, a gain-adjusted first input signal Pin is generated. Moreover, by subtracting the gain-adjusted first input signal Pin from the second input signal Qin, the adder 420 obtains the second output signal Qo.

The weighting correlator 450 comprises a weighting function generator 461, two multipliers 471, 472, and an accumulator 482.

In this embodiment, when the first output signal Po and the second output signal Qo cross a zero crossing point, the weighting function generator 461 generates a weighting function. Moreover, the product of the first output signal Po and the second output signal Qo (also referred as a first result) is obtained by the first multiplier 471. Moreover, the product of the first result and the weighting function (also referred as a second result) is obtained by the second multiplier 472. After the second result from the second multiplier 472 is accumulated by the accumulator 482, the integrated signal Iw is generated.

For example, in case that the phase difference between the first input signal Pin and the second input signal Qin is not 90 degrees, the first input signal Pin and the second input signal Qin may be expressed as $A \sin(\omega t)$ and $B \cos(\omega t+\theta)$, respectively. That is, the phase difference between the first input signal Pin and the second input signal Qin is $(90+\theta)$ degrees. Moreover, the second input signal Qin=$B \cos(\omega t+\theta)$=$B \cos \theta \cos(\omega t) - B \sin \theta \sin(\omega t)$. After the component [$B \sin \theta \sin(\omega t)$] of the second input signal Qin is eliminated, the phase difference between the second output signal Qo and the first output signal Po is 90 degrees.

Consequently, according to the phase relationship between the first output signal Po and the second output signal Qo, the weighting correlator 450 generates the integrated signal Iw. According to the integrated signal Iw, the gain of the gain-adjustable amplifier 410 is adjusted. Moreover, by subtracting the gain-adjusted first input signal Pin from the second input signal Qin, the adder 420 obtains the second output signal Qo. Under this circumstance, the phase difference between the second output signal Qo and the first output signal Po is 90 degrees.

Figure 4B:
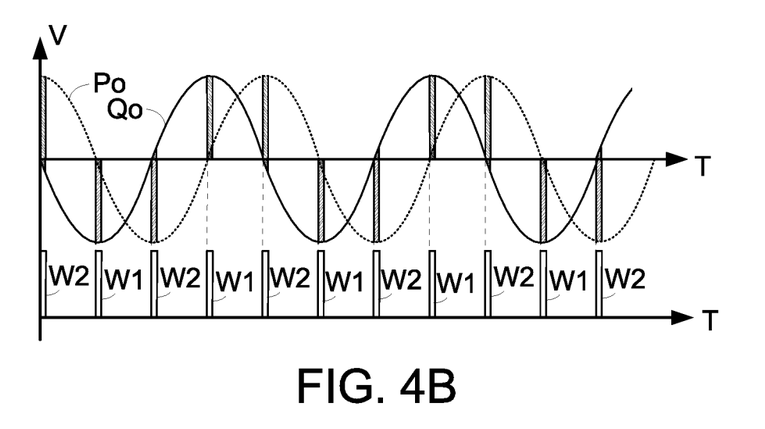
FIGS. 4B-4C are schematic timing waveform diagrams illustrating associated signal processed by the phase adjusting unit.
Figure 4C:
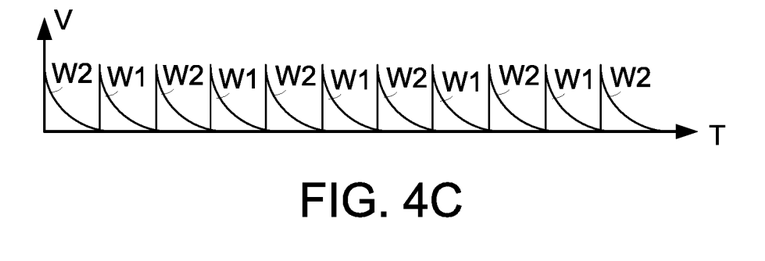

FIGS. 4B-4C are schematic timing waveform diagrams illustrating associated signal processed by the phase adjusting unit. In FIG. 4B, the operations of the phase adjusting unit 220 are illustrated by using the pulse train function as the weighting function. Please refer to FIG. 4B. Whenever the first output signal Po and the second output signal Qo cross the zero crossing point, the weighting function generator 461 generates a pulse train function. Moreover, the product of the first result and the pulse train function (i.e. the second result) is obtained by the second multiplier 472. The second result is the shadow areas shown in FIG. 4B.

After the second result from the second multiplier 472 is accumulated by the accumulator 482, the integrated signal Iw is generated. According to the integrated signal Iw, the gain of the gain-adjustable amplifier 410 is correspondingly adjusted. Consequently, the phase of the second output signal Qo is gradually adjusted until the phase difference between the second output signal Qo and the first output signal Po is 90 degrees.

In practical applications, the second multiplier 472 may be implemented by a programmable counter. That is, when the number of times the first output signal Po or the second output signal Qo cross the zero crossing point reaches a predetermined number, the accumulation operation of the accumulator 482 is stopped. That is, the number of the first result to be inputted into the accumulator 482 is controlled. Moreover, the positions of the two multipliers 471 and 472 may be exchanged with each other.

It is noted that numerous modifications and alterations may be made while retaining the teachings of the invention. For example, in another embodiment, the weighting function is an exponential decay function (see FIG. 4C).

Figure 4D:
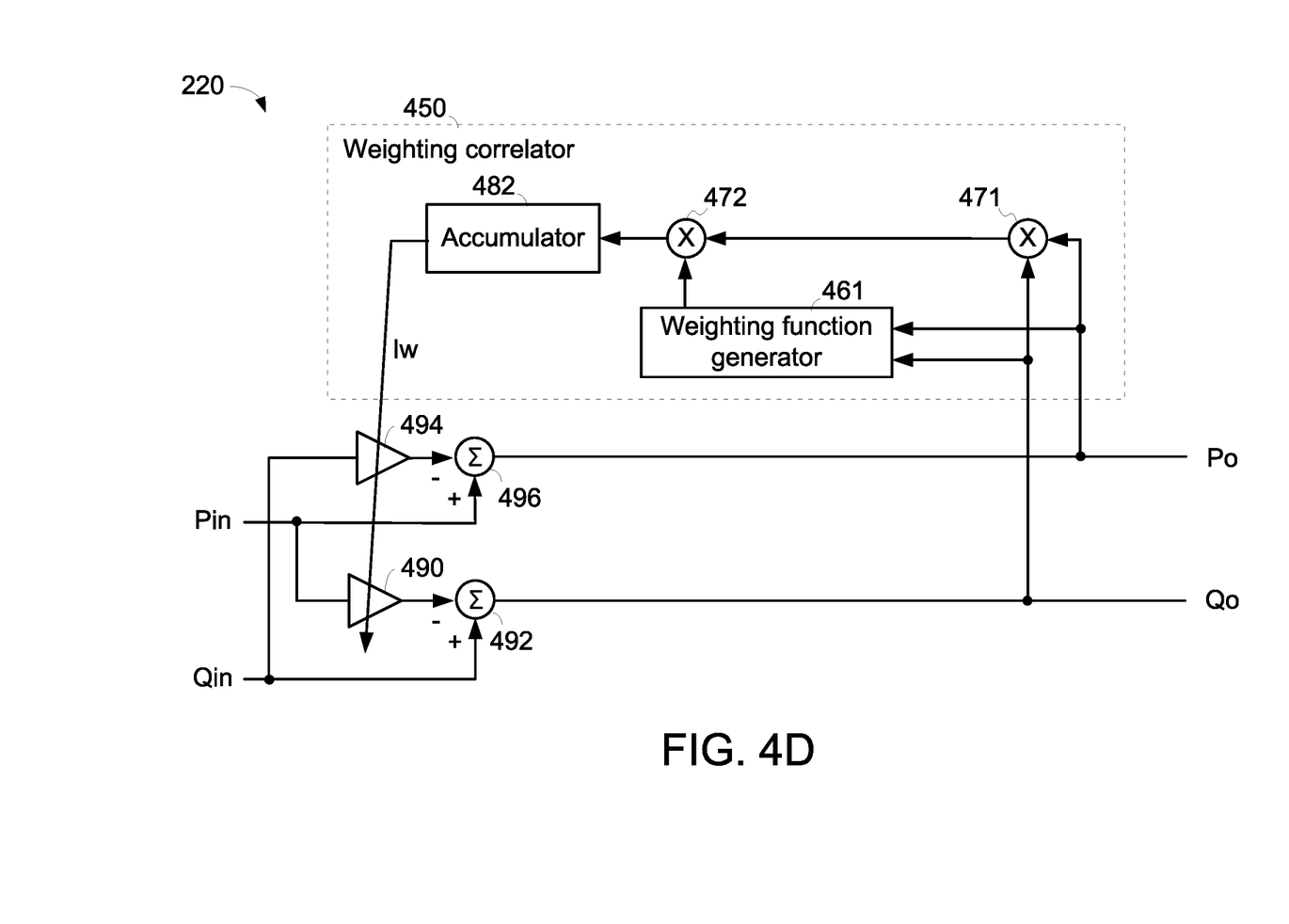
FIG. 4D is a schematic functional block diagram illustrating another phase adjusting unit of the signal processing apparatus according to an embodiment of the present invention.

FIG. 4D is a schematic functional block diagram illustrating another phase adjusting unit of the signal processing apparatus according to an embodiment of the present invention. As shown in FIG. 4D, the phase adjusting unit 220 comprises a first gain-adjustable amplifier 490, a first adder 492, a second gain-adjustable amplifier 494, a second adder 496 and a weighting correlator 450. The phase difference between a first input signal Pin and a second input signal Qin is about 90 degrees. The phase difference between the first output signal Po and a second output signal Qo is 90 degrees. The first adjusted signal A1 and the second adjusted signal B1 from the DC offset adjusting unit 210 may be respectively used as the first input signal Pin and the second input signal Qin of the phase adjusting unit 220. Alternatively, the second adjusted signal B1 and the first adjusted signal A1 may be respectively used as the first input signal Pin and the second input signal Qin of the phase adjusting unit 220. The first output signal Po and the second output signal Qo from the phase adjusting unit 220 may be considered as the third adjusted signal A2 and the fourth adjusted signal B2, respectively.

Moreover, according to an integrated signal Iw outputted from the weighting correlator 450, a first gain of the gain-adjustable amplifier 490 and a second gain of the gain-adjustable amplifier 494 are correspondingly adjusted. After the first input signal Pin is received by the first gain-adjustable amplifier 490, a gain-adjusted first input signal Pin is generated. Moreover, by subtracting the gain-adjusted first input signal Pin from the second input signal Qin, the first adder 492 obtains the second output signal Qo. The same, after the second input signal Qin is received by the second gain-adjustable amplifier 494, a gain-adjusted second input signal Qin is generated. Moreover, by subtracting the gain-adjusted second input signal Qin from the first input signal Pin, the second adder 496 obtains the first output signal Po.

The weighting correlator 450 comprises a weighting function generator 461, two multipliers 471, 472, and an accumulator 482.

In this embodiment, when the first output signal Po and the second output signal Qo cross a zero crossing point, the weighting function generator 461 generates a weighting function. Moreover, the product of the first output signal Po and the second output signal Qo (also referred as a first result) is obtained by the first multiplier 471. Moreover, the product of the first result and the weighting function (also referred as a second result) is obtained by the second multiplier 472. After the second result from the second multiplier 472 is accumulated by the accumulator 482, the integrated signal Iw is generated.

Figure 5A:
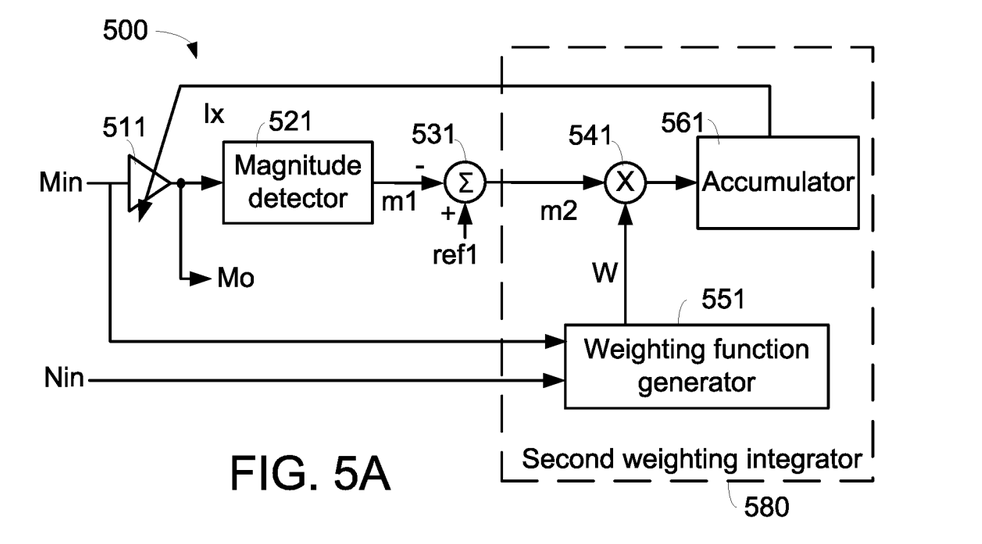
FIG. 5A is a schematic functional block diagram illustrating the amplitude adjusting unit of the signal processing apparatus according to an embodiment of the present invention.

FIG. 5A is a schematic functional block diagram illustrating the amplitude adjusting unit of the signal processing apparatus according to an embodiment of the present invention. As shown in FIG. 5A, the amplitude adjusting unit 230 comprises two amplitude adjusting circuits 500. For clarification and brevity, only one amplitude adjusting circuit 500 is shown in the drawing. The amplitude adjusting circuit 500 comprises a gain-adjustable amplifier 511, a magnitude detector 521, an adder 531, and a second weighting integrator 580. Moreover, by gradually increasing the gain of the gain-adjustable amplifier 511, the amplitude adjusting circuit 500 may adjust the amplitude of a output signal Mo to a fixed value.

The third adjusted signal A2 and the fourth adjusted signal B2 from the phase adjusting unit 220 may be respectively used as the first input signal Min and a second input signal Nin of the amplitude adjusting circuit 500. Consequently, the amplitude of the third adjusted signal A2 is adjusted to the fixed value by the amplitude adjusting circuit 500. Alternatively, the fourth adjusted signal B2 and the third adjusted signal A2 may be respectively used as the first input signal Min and the second input signal Nin of the amplitude adjusting circuit 500. Consequently, the amplitude of the fourth adjusted signal B2 is adjusted to the fixed value by the amplitude adjusting circuit 500.

Moreover, according to an integrated signal Ix outputted from the second weighting integrator 580, a gain of the gain-adjustable amplifier 511 is correspondingly adjusted. After the first input signal Min is received by the gain-adjustable amplifier 511, the output signal Mo is generated.

Moreover, after the output signal Mo is detected by the magnitude detector 521, a magnitude signal m1 is generated. By subtracting the magnitude signal m1 from a reference value ref1, the adder 531 generates a sampling signal m2. Then, the sampling signal m2 is inputted into the second weighting integrator 580.

The second weighting integrator 580 comprises a weighting function generator 551, a multiplier 541, and an accumulator 561.

In this embodiment, when the first input signal Min and the second input signal Nin cross a zero crossing point, the weighting function generator 551 generates a weighting function W. Moreover, the product of the sampling signal m2 and the weighting function W is obtained by the multiplier 541 and transmitted to the accumulator 561. After the product of the sampling signal m2 and the weighting function W is accumulated by the accumulator 561, the integrated signal Ix is generated.

In this embodiment, the magnitude detector 521 is implemented by a squarer circuit or an absolute value circuit. The squarer circuit is used to obtain a square value of the output signal Mo. The absolute value circuit is used to acquire the absolute value of the output signal Mo.

Figure 5B:
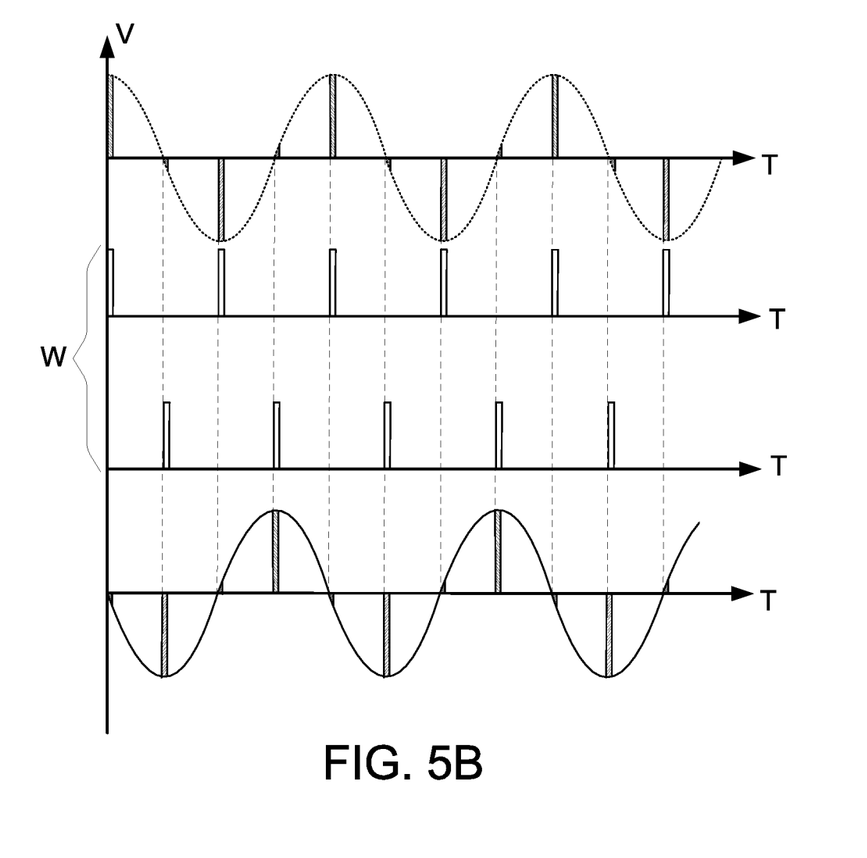
FIG. 5B is a schematic timing waveform diagram illustrating associated signal processed by the amplitude adjusting unit.

FIG. 5B is a schematic timing waveform diagram illustrating associated signal processed by the amplitude adjusting unit. In this embodiment, the weighting function is a pulse train function. In FIG. 5B, the operations of the amplitude adjusting unit 230 are illustrated by using the pulse train function as the weighting function. Please refer to FIG. 5B. Whenever the first input signal Min and a second input signal Nin cross a zero crossing point, the weighting function generator 551 generates a weighting function W. Moreover, the product of the sampling signal m2 (i.e. the difference between the reference value ref1 and the magnitude signal m1) and the weighting function W is obtained by the multiplier 541 and transmitted to the accumulator 561.

After the product of the sampling signal m2 and the weighting function W is accumulated by the accumulator 561, the integrated signal Ix is generated. According to the integrated signal Ix, the gain of the gain-adjustable amplifier 511 is correspondingly adjusted. Consequently, the amplitude of the output signal Mo is gradually adjusted to be maintained at the fixed value.

It is noted that numerous modifications and alterations may be made while retaining the teachings of the invention. For example, in another embodiment, the weighting function is an exponential decay function.

In other words, the amplitude of the first output signal Aout from the amplitude adjusting unit 230 may be maintained at the fixed value. Similarly, the amplitude of the second output signal Bout from the amplitude adjusting unit 230 may be maintained at the fixed value.

Alternatively, in another embodiment, the inputs of the weighting function generator 551 may be replaced by the first output signal Aout and the second output signal Bout.

Moreover, according to the quality of the first photoelectronic signal Ain and the second photoelectronic signal Bin, the signal processing apparatus may contain one or two of the DC offset adjusting unit 210, the phase adjusting unit 220 and the amplitude adjusting unit 230.

For example, if the first photoelectronic signal Ain and the second photoelectronic signal Bin do not contain the DC offsets, the signal processing apparatus may only contain the phase adjusting unit 220 and the amplitude adjusting unit 230. Alternatively, if the phases and the amplitudes of the first photoelectronic signal Ain and the second photoelectronic signal Bin do not need to be adjusted, the signal processing apparatus may only contain the DC offset adjusting unit 210. The detailed descriptions of the signal processing apparatus containing any combination of the DC offset adjusting unit 210, the phase adjusting unit 220 and the amplitude adjusting unit 230 are omitted herein.

In the above embodiments, the weighting functions are generated when associated signals cross the zero crossing point. It is noted that, however, those skilled in the art will readily observe that numerous modifications and alterations may be made while retaining the teachings of the invention. In some other embodiments, after associated signals have crossed the zero crossing point for a certain time period, the weighting functions are generated. In other words, the weighting functions are generated when associated signals cross the neighboring points of the zero crossing point.

From the above descriptions, the present invention provides a signal processing apparatus. The signal processing apparatus is used for processing time variant signals (e.g. the two photoelectronic signals) that are outputted from an optical encoder of a servo motor system. Moreover, the DC offset adjusting unit, the phase adjusting unit and the amplitude adjusting unit of the present invention maybe implemented by using hardware circuits. That is to say, the signal processing apparatus of the present invention is capable of eliminating the DC offset of the two photoelectronic signals by using a DC offset adjusting circuit, fixing the phase difference between the two photoelectronic signals by using a phase adjusting circuit and maintaining the amplitudes of the two photoelectronic signals by using an amplitude adjusting circuit.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A signal processing apparatus for processing a time variant signal, the signal processing apparatus receiving a first input signal and a second input signal, the first input signal being directly used as a first output signal, the signal processing apparatus comprising:
    a first gain-adjustable amplifier, wherein a gain of the first gain-adjustable amplifier is adjusted according to a first integrated signal, wherein after the first input signal is received by the first gain-adjustable amplifier, a gain-adjusted first input signal is generated by the first gain-adjustable amplifier;
    a first adder for subtracting the gain-adjusted first input signal from the second input signal, thereby generating a second output signal; and
    a weighting correlator receiving the first output signal and the second output signal, and generating the first integrated signal, wherein the weighting correlator comprises:
        a weighting function generator receiving the first output signal and the second output signal, wherein when the first output signal and the second output signal cross a zero crossing point, the weighting function generator generates a weighting function;
        a first multiplier for performing a multiplication on the first output signal and the second output signal, thereby obtaining a first result;
        a second multiplier for performing a multiplication on the weighting function and the first result, thereby obtaining a second result; and
        an accumulator connected to the second multiplier for accumulating the second result, thereby generating the first integrated signal.

2. The signal processing apparatus as claimed in claim 1, wherein the weighting function is a pulse train function or an exponential decay function.

3. The signal processing apparatus as claimed in claim 1, wherein the second multiplier is a programmable counter for controlling a number of the first result to be inputted into the accumulator.

4. The signal processing apparatus as claimed in claim 1, wherein the first input signal and the second input signal are generated by a optical sensor, wherein a phase relationship between the first input signal and the second input signal is adjusted by the signal processing apparatus, so that a phase difference between the first output signal and the second output signal is 90 degrees.

5. The signal processing apparatus as claimed in claim 1, further comprising an amplitude adjusting unit, wherein the amplitude adjusting unit comprises:
    a second gain-adjustable amplifier, wherein a gain of the second gain-adjustable amplifier is adjusted according to a second integrated signal, wherein the second gain-adjustable amplifier receives the first output signal and generates a third output signal;
    a first magnitude detector receiving the third output signal, and generating a first magnitude signal;
    a second adder for subtracting the first magnitude signal from a reference value, thereby generating a first sampling signal; and
    a first weighting integrator receiving the first output signal, the second output signal and the first sampling signal, and generating the second integrated signal.

6. The signal processing apparatus as claimed in claim 5, further comprising:
    a third gain-adjustable amplifier, wherein a gain of the third gain-adjustable amplifier is adjusted according to a third integrated signal, wherein the third gain-adjustable amplifier receives the second output signal and generates a fourth output signal;
    a second magnitude detector receiving the fourth output signal, and generating a second magnitude signal;
    a third adder for subtracting the second magnitude signal from the reference value, thereby generating a second sampling signal; and
    a second weighting integrator receiving the first output signal, the second output signal and the second sampling signal, and generating the third integrated signal.

7. The signal processing apparatus as claimed in claim 6, wherein each of the first magnitude detector and the second magnitude detector is a squarer circuit or an absolute value circuit.

8. The signal processing apparatus as claimed in claim 6, wherein an amplitude of the first output signal and an amplitude of the second output signal are adjusted by the amplitude adjusting unit, so that an amplitude of the third output signal and an amplitude of the fourth output signal are identical.

* * * * *